(12) United States Patent  (10) Patent No.: US 9,316,301 B2
Maddy  (45) Date of Patent: Apr. 19, 2016

(54) MULTIPLE PLANETARY GEAR-SET WITH A LIMITED SLIP TRANSMISSION SYSTEM

(71) Applicant: Gale E. Maddy, Greeneville, TN (US)

(72) Inventor: Gale E. Maddy, Greeneville, TN (US)

(*) Notice: Subject to any disclaimer, the term of this patent is extended or adjusted under 35 U.S.C. 154(b) by 0 days.

(21) Appl. No.: 14/337,368

(22) Filed: Jul. 22, 2014

(65) Prior Publication Data

US 2015/0065289 A1  Mar. 5, 2015

Related U.S. Application Data

(60) Provisional application No. 61/871,484, filed on Aug. 29, 2013.

(51) Int. Cl.

| | |
|---|---|
| *F16H 48/20* | (2012.01) |
| *F16H 48/10* | (2012.01) |
| *B62D 11/14* | (2006.01) |
| *F16H 48/11* | (2012.01) |

(52) U.S. Cl.
CPC .............. *F16H 48/20* (2013.01); *B62D 11/14* (2013.01); *F16H 48/10* (2013.01); *F16H 48/11* (2013.01); *F16H 2048/104* (2013.01); *F16H 2048/106* (2013.01)

(58) Field of Classification Search
None
See application file for complete search history.

(56) References Cited

U.S. PATENT DOCUMENTS

| 5,722,501 A * | 3/1998 | Finch ..................... B60K 1/00 180/6.44 |
| 5,853,346 A * | 12/1998 | Gaffney ................ F16H 1/2818 475/1 |
| 7,074,151 B2 * | 7/2006 | Thompson ........... B60K 7/0007 180/6.28 |

* cited by examiner

*Primary Examiner* — Erin D Bishop

(57) ABSTRACT

A gear assembly with two inputs and two outputs which can be used on zero turn riding mowers or similar vehicles. The first input is a propelling input and the second input is a steering input. The assembly contains a planet carrier, a first planetary gear assembly, and a second planetary gear assembly. The propelling input is engaged with the planet carrier. The first and second planetary gear assemblies contain a ring gear. The steering input is engaged with the ring gears. The steering input is either a helical bevel gear, straight bevel gear, or a gear train. In another version, the gear assembly can have two planet carriers connected externally to the planetary gear assemblies. In this instance, a central gear is used in between the first planetary gear assembly and the second planetary gear assembly to connect the sun gears.

7 Claims, 20 Drawing Sheets

MULTIPLE PLANETARY GEAR-SET WITH A LIMITED SLIP TRANSMISSION SYSTEM

The current application claims a priority to the U.S. Provisional patent application Ser. No. 61/871,484 filed on Aug. 29, 2013.

FIELD OF THE INVENTION

The present invention relates generally to a gear assembly that results in mechanical advantage. More specifically, the present invention is a gear arrangement that can be utilized in self-propelled lawn mowers and other comparable mobile equipment.

BACKGROUND OF THE INVENTION

Mechanical advantage is a measure of the force amplification achieved by using a tool, mechanical device or machine system. Gear systems have proven to be one of the most effective machines in achieving mechanical advantage. The effectiveness of gear systems is such that almost all moving equipment that we see today has a gear system integrated. According to the functionality of the machine, the utilized gear system can vary. The amount of torque, speed, and direction of movement depends upon the gear's design. More specifically, the components and the arrangement of a gear system differ from one to another. The main concept behind a gear system is the transfer of rotational force from one gear or device to another.

Gear systems have a series of advantages and disadvantages. The advantages include the ability to transmit the exact velocity ratio, the ability to transmit large power, the ability to be used for small center distances of shafts, having high efficiency, reliability, and having a compact layout. Requiring constant maintenance and the noise produced while in operation are some of the notable disadvantages.

The present invention is related to the gear system used in zero turn riding (ZTR) mowers and other comparable mobile equipment. The ZTR mower functions such that if one wheel turns more rapidly than the other, the machine moves along a curved path. If both wheels turn at the same speed, the machine follows a straight path. If one wheel turns and the other stops, or if the wheels turn in opposite directions, the mower pivots. However, when a single wheel spins, the turf the mower is used on is damaged. Furthermore, with the current controlling mechanism, turning and handling the ZTR mower on side hills and wet grass can be unfavorable.

The objective of the present invention is to address the aforementioned issues. More specifically, the present invention introduces a gear assembly that receives two inputs and also has two outputs. In particular, the present invention has a propelling input and a steering input. The propelling input spins both wheels in the same direction at the same speed. If the input speed is increased, the wheels are spun at a higher speed. If the direction is reversed, the direction of the wheels is reversed. The steering input of the present invention turns one wheel forward and the other wheel backwards. The wheels turn at the same speed in opposite directions. The steering input of the present invention allows the mower to be directed either left or right. Most importantly, the inputs are additive. As an example if the propelling input is simultaneously used with the steering input, one wheel will slow down and the other wheel will speed up. The output speeds are totally defined by the input speeds.

With the use of the present invention in vehicles such as ZTR mowers, the damage caused to the turf can be significantly reduced. Furthermore, by utilizing the present invention on a mobile vehicle, the ground traction between the wheels of the vehicle and the turf is better maintained. As a result, a user can control the mobile equipment on wet grass or on side hills much more effectively.

DETAIL DESCRIPTIONS OF THE INVENTION

All illustrations of the drawings are for the purpose of describing selected versions of the present invention and are not intended to limit the scope of the present invention.

The present invention is a multiple planetary gear assembly with a limited slip transmission system. In particular, the present invention has two inputs and two outputs. The present invention is used to provide a piece of mobile equipment with better ground traction. More specifically, the present invention prevents one wheel from slipping independent of the other wheel.

Figure 1:
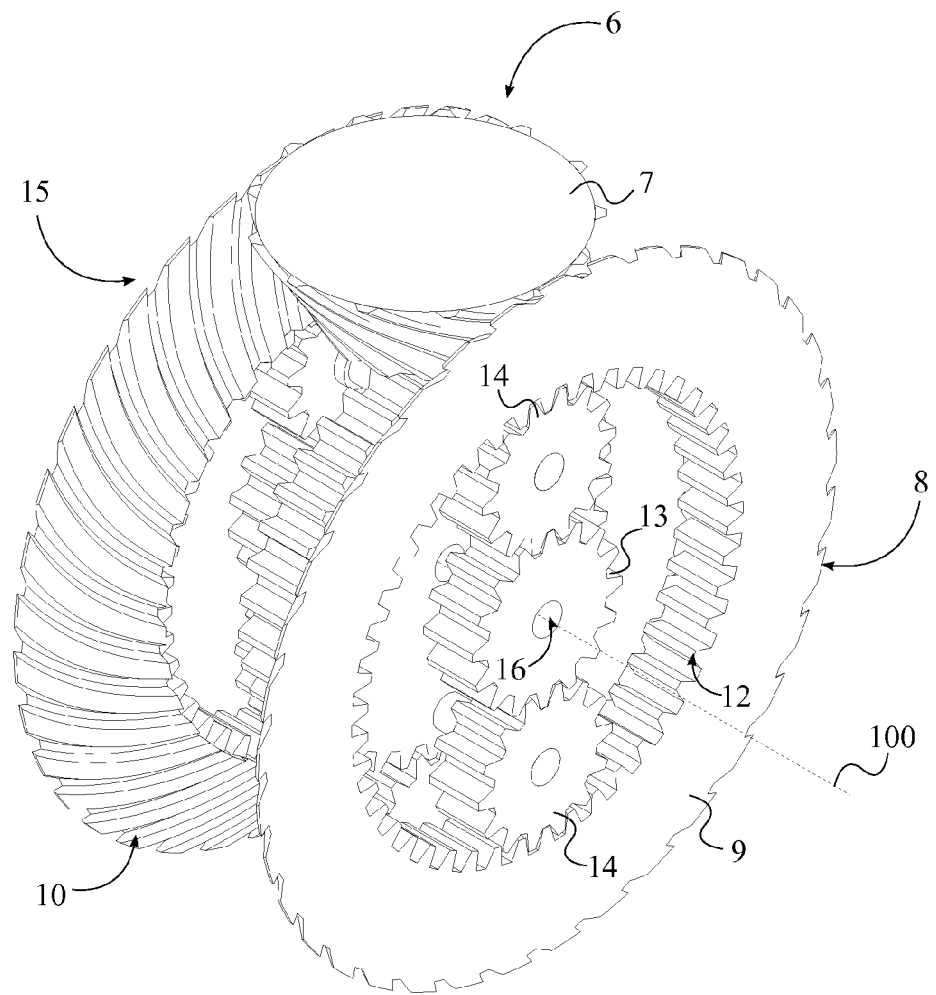
FIG. 1 is a perspective view of the first configuration of the present invention, wherein the steering input is shown in its first embodiment.
Figure 2:
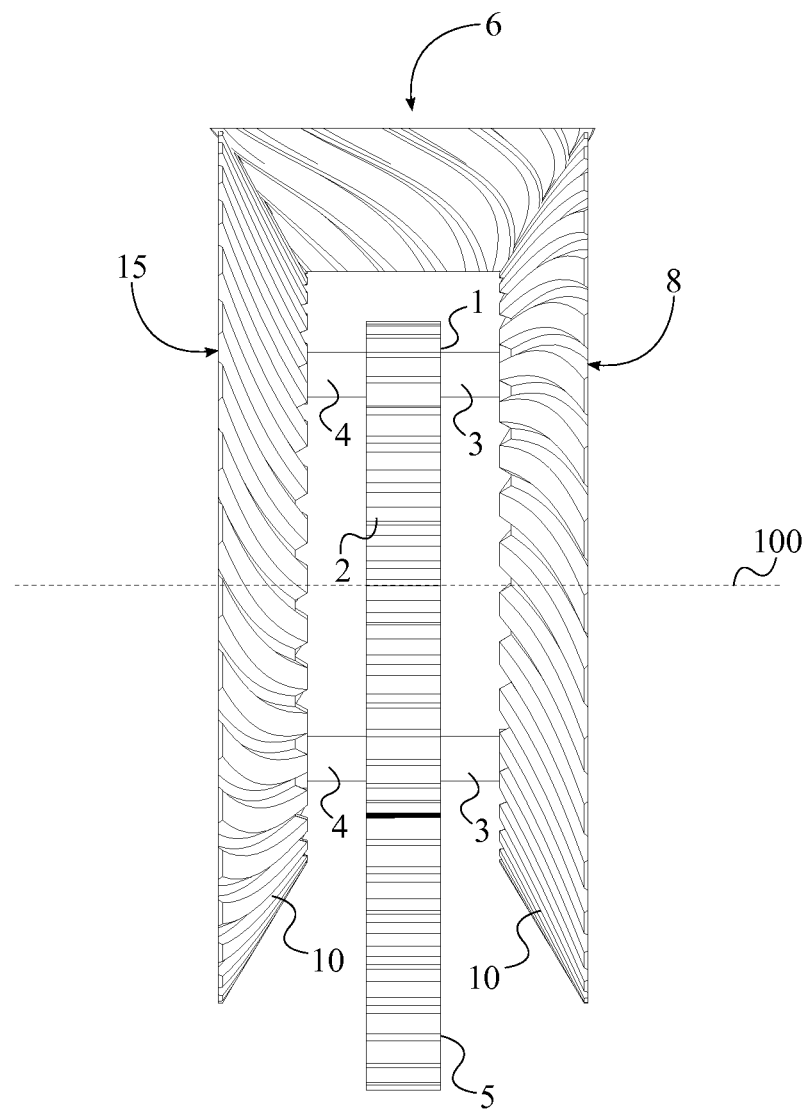
FIG. 2 is a front view of the first configuration of the present invention, wherein the steering input is shown in its first embodiment.
Figure 3:
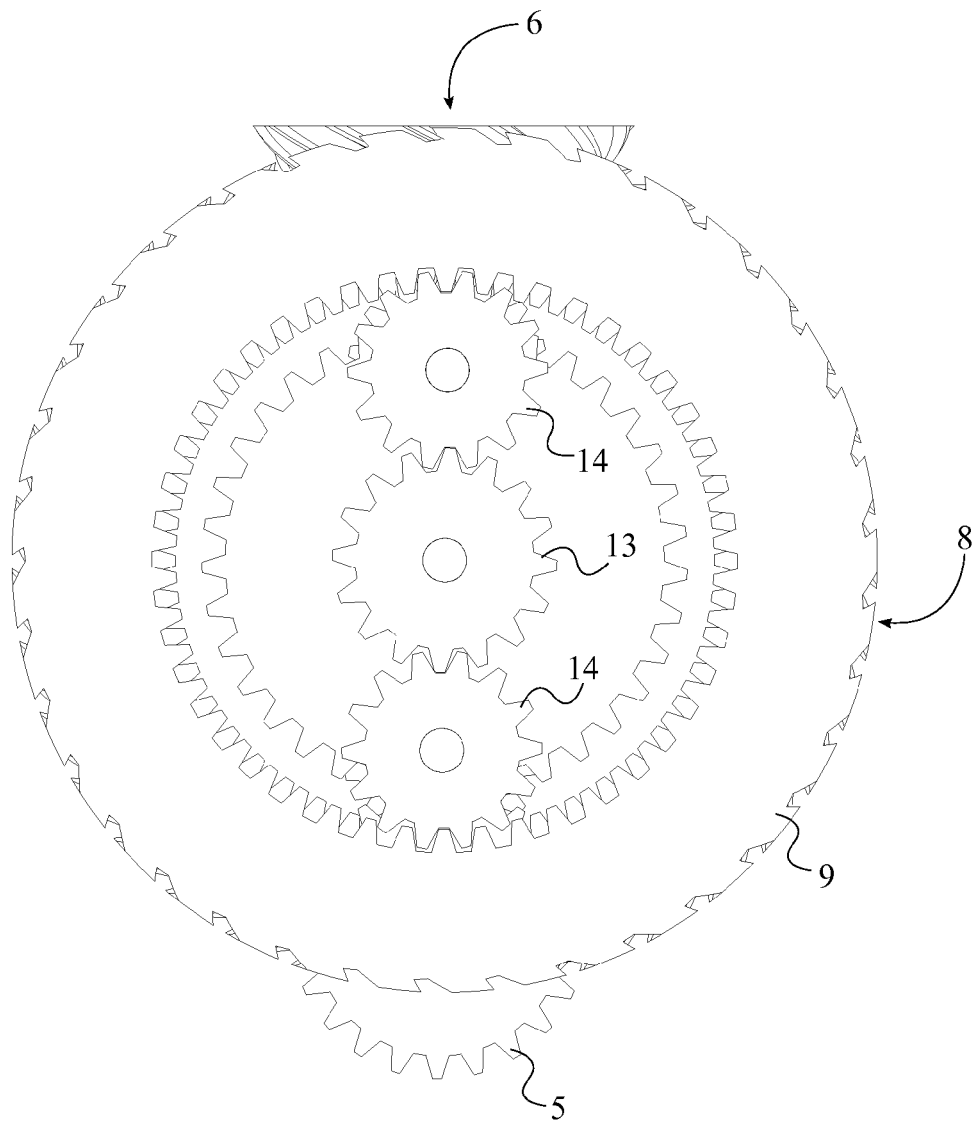
FIG. 3 is a left side view of the first configuration of the present invention, wherein the steering input is shown in its first embodiment.
Figure 4:
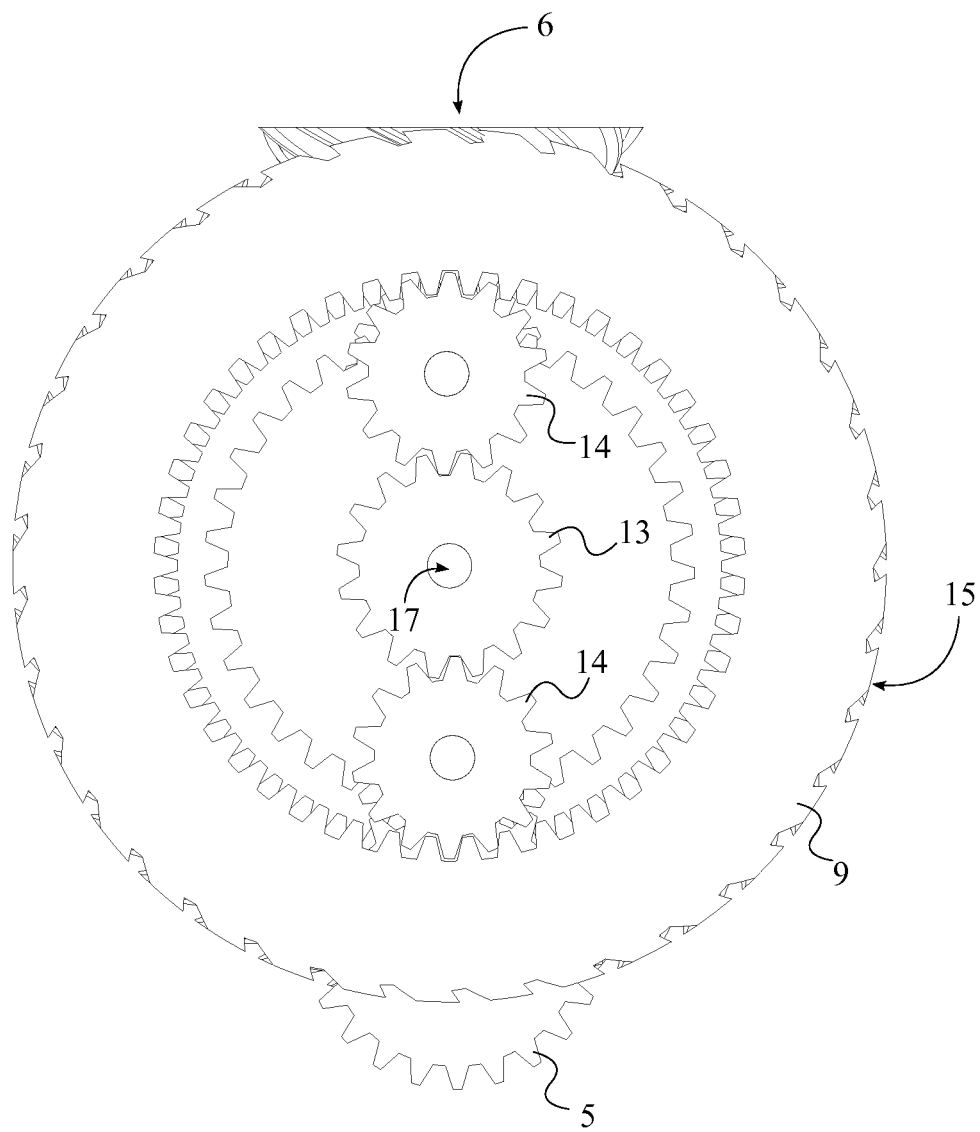
FIG. 4 is a right side view of the first configuration of the present invention, wherein the steering input is shown in its first embodiment.

As illustrated in FIGS. 1-12, the first configuration of the present invention comprises a planet carrier 1, a propelling input 5, a first output 16, a steering input 6, a second output 17, a first planetary gear assembly 8, and a second planetary gear assembly 15. The propelling input 5 determines if the present invention results in forward motion or backwards motion. The steering input 6 determines if the present invention results in leftward motion or rightward motion. The propelling input 5 and the steering input 6 transfer rotational motion to the first output 16 and the second output 17. The first output 16 and the second output 17 are additive such that forward or backward motion can be used along with leftward or rightward motion. More specifically, the propelling input 5 can be used in conjunction with the steering input 6 or vice versa. The first planetary gear assembly 8 and the second planetary gear assembly 15 each comprise a ring gear 9, a sun gear 13, and a plurality of planet gears 14. As seen in FIGS. 2, 3, and 4, the sun gear 13 and the ring gear 9 are concentrically mounted on a central rotational axis 100. The propelling input 5 is operatively engaged to the planet carrier 1 in order to rotationally drive the planet carrier 1 in a forward or backward direction. The steering input 6 is externally and operatively engaged with the ring gear 9 of both the first planetary gear assembly 8 and the second planetary gear assembly 15. Depending on the rotational direction of the steering input 6, the ring gear 9 of the first planetary gear assembly 8 and the ring gear 9 of second planetary gear assembly 15 have opposite rotational directions about the central rotational axis 100. The planet carrier 1 is positioned between the first planetary gear assembly 8 and the second planetary gear assembly 15 such that the first planetary gear assembly 8, the planet carrier 1, and the second planetary gear assembly 15 are positioned parallel to each other. The first output 16 is axially connected to the sun gear 13 of the first planetary gear assembly 8. Therefore, the first output 16 is driven by the sun gear 13 of the first planetary gear assembly 8. Similarly, the second output 17 is axially connected to the sun gear 13 of the second planetary gear assembly 15 which allows the second output 17 to be driven by the sun gear 13 of the second planetary gear assembly 15.

The planet carrier 1 is positioned in between the first planetary gear assembly 8 and the second planetary gear assembly 15. As seen in FIG. 2, the planet carrier 1 comprises a spur gear 2, a plurality of first mounts 3, and a plurality of second mounts 4. Each of the plurality of first mounts 3 is rotatably connected to a corresponding planet gear from the first planetary gear assembly 8. Similarly, each of the plurality of second mounts 4 is rotatably connected to a corresponding planet gear from the second planetary gear assembly 15. As seen in FIG. 3 and FIG. 4, only two planet gears have been utilized for each planetary gear assembly in the first configuration of the present invention.

Figure 5:
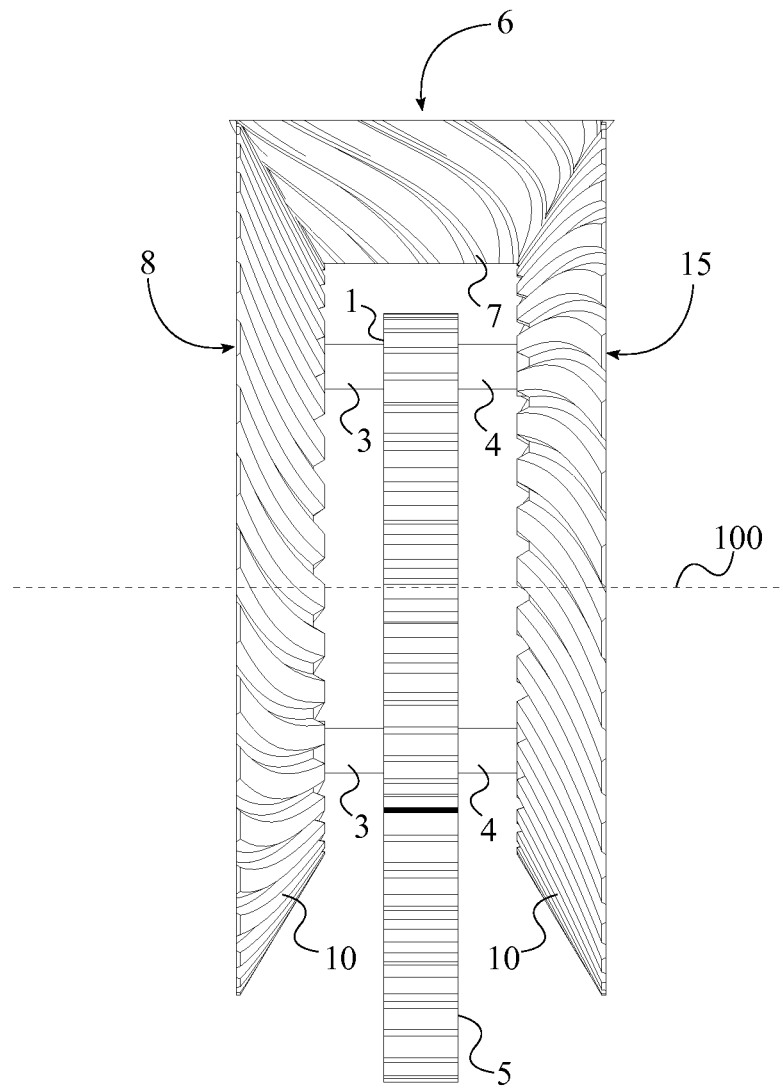
FIG. 5 is a rear view of the first configuration of the present invention, wherein the steering input is shown in its first embodiment.
Figure 6:
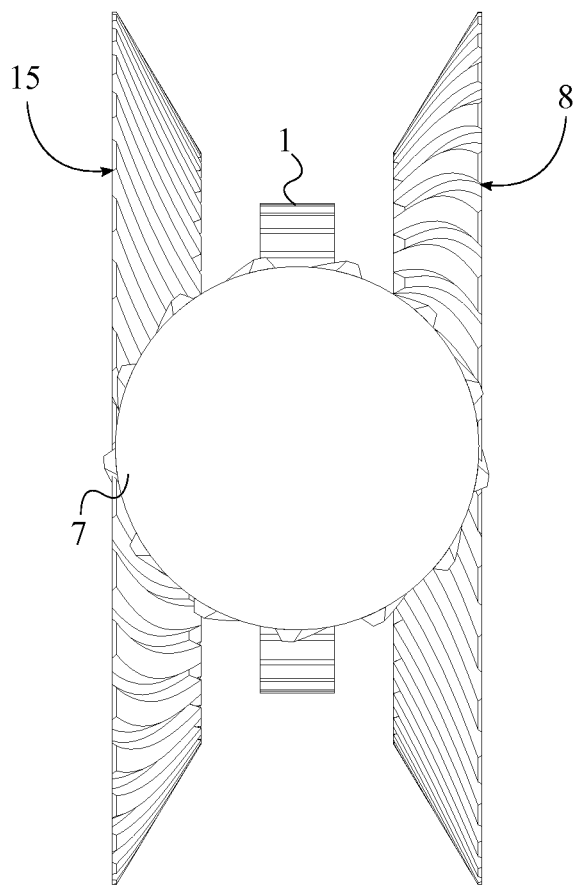
FIG. 6 is a top view of the first configuration of the present invention, wherein the steering input is shown in its first embodiment.
Figure 7:
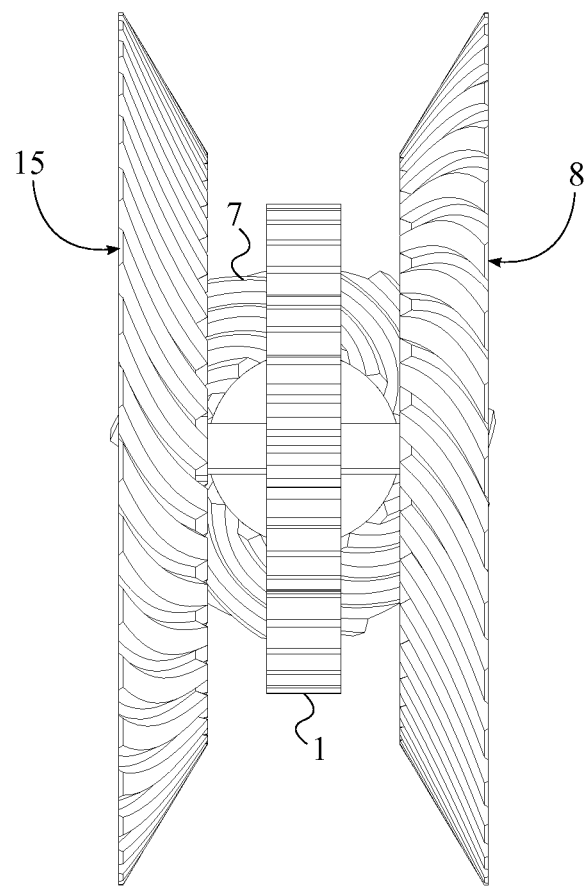
FIG. 7 is a bottom view of the first configuration of the present invention, wherein the steering input is shown in its first embodiment.
Figure 8:
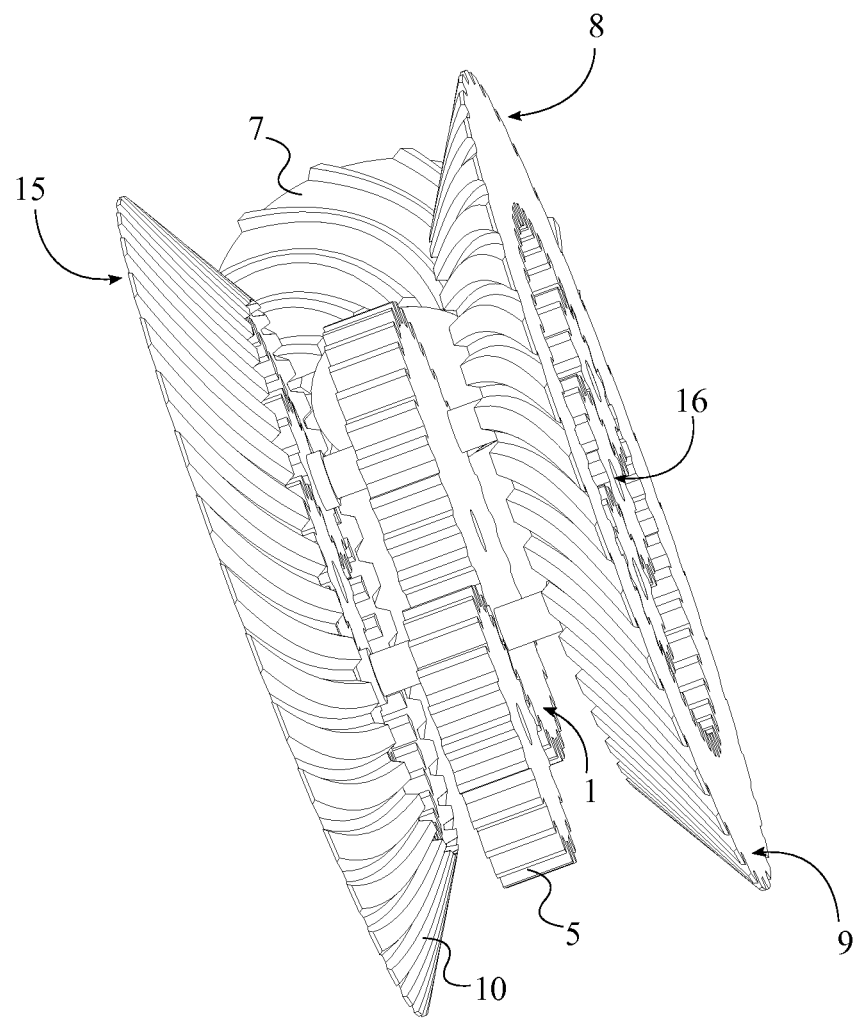
FIG. 8 is a bottom perspective view of the first configuration of the present invention, wherein the steering input is shown in its first embodiment.
Figure 10:
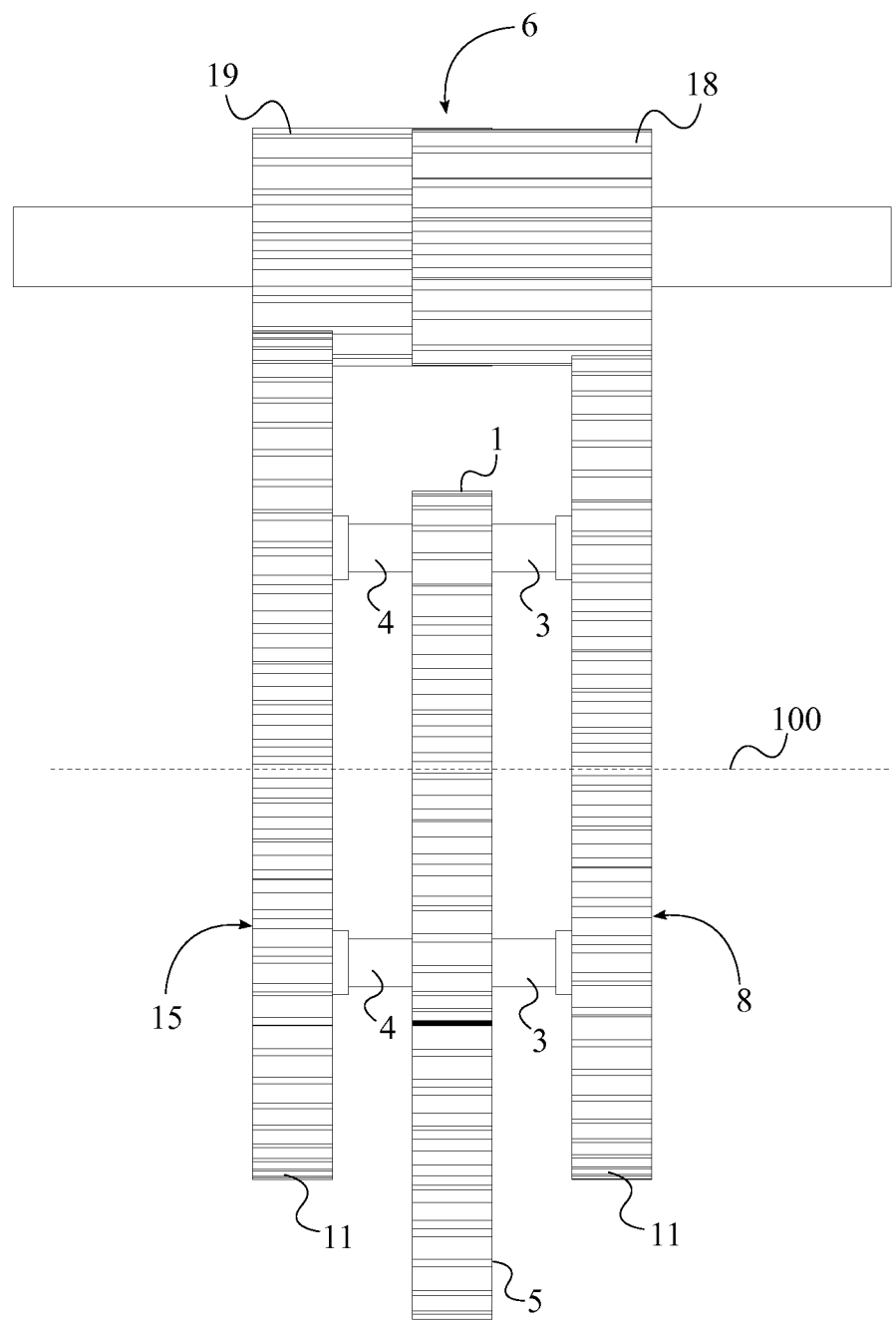
FIG. 10 is a front view of the first configuration of the present invention, wherein the steering input is shown in its second embodiment.
Figure 11:
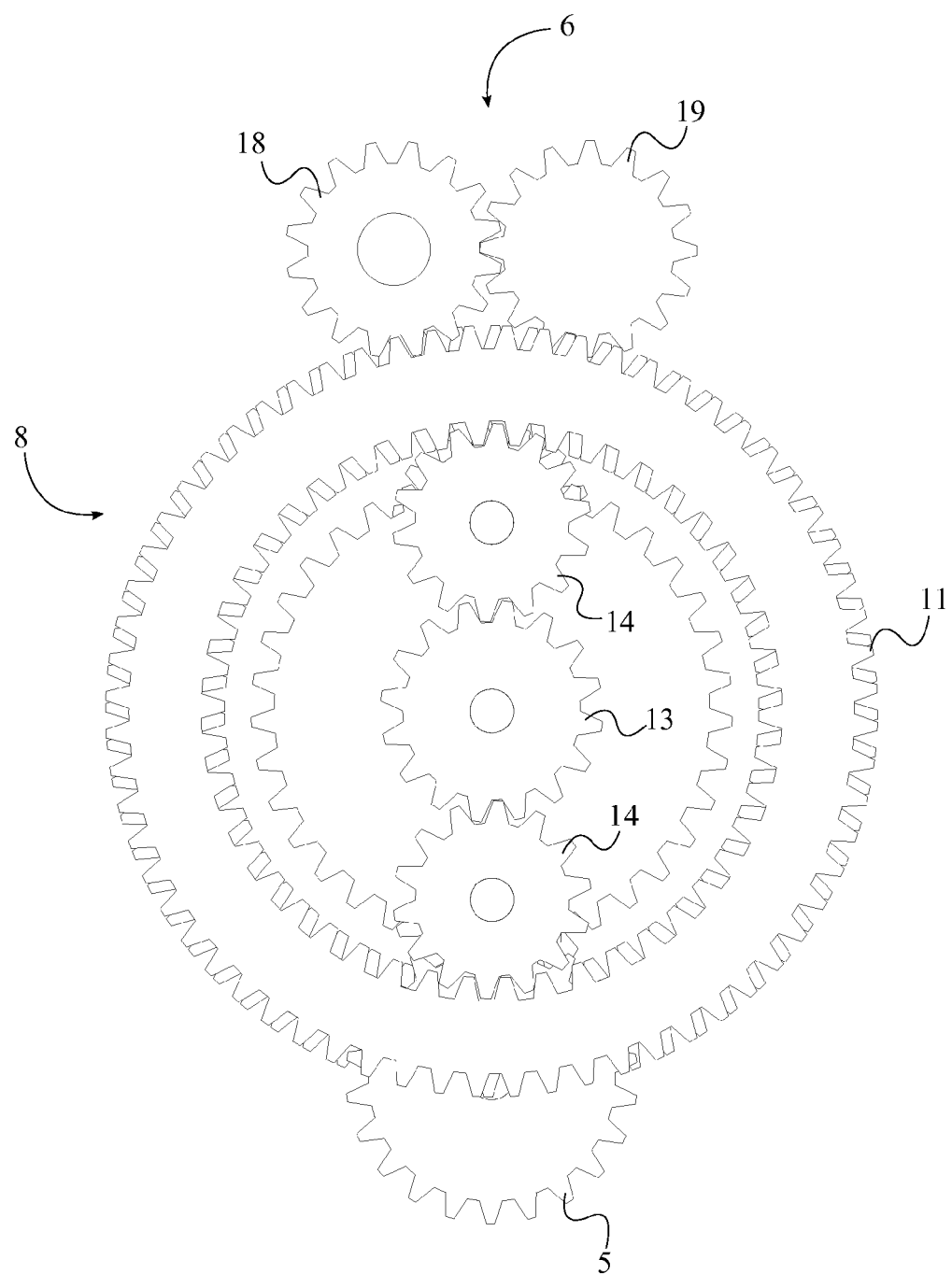
FIG. 11 is a left side view of the first configuration of the present invention, wherein the steering input is shown in its second embodiment.
Figure 12:
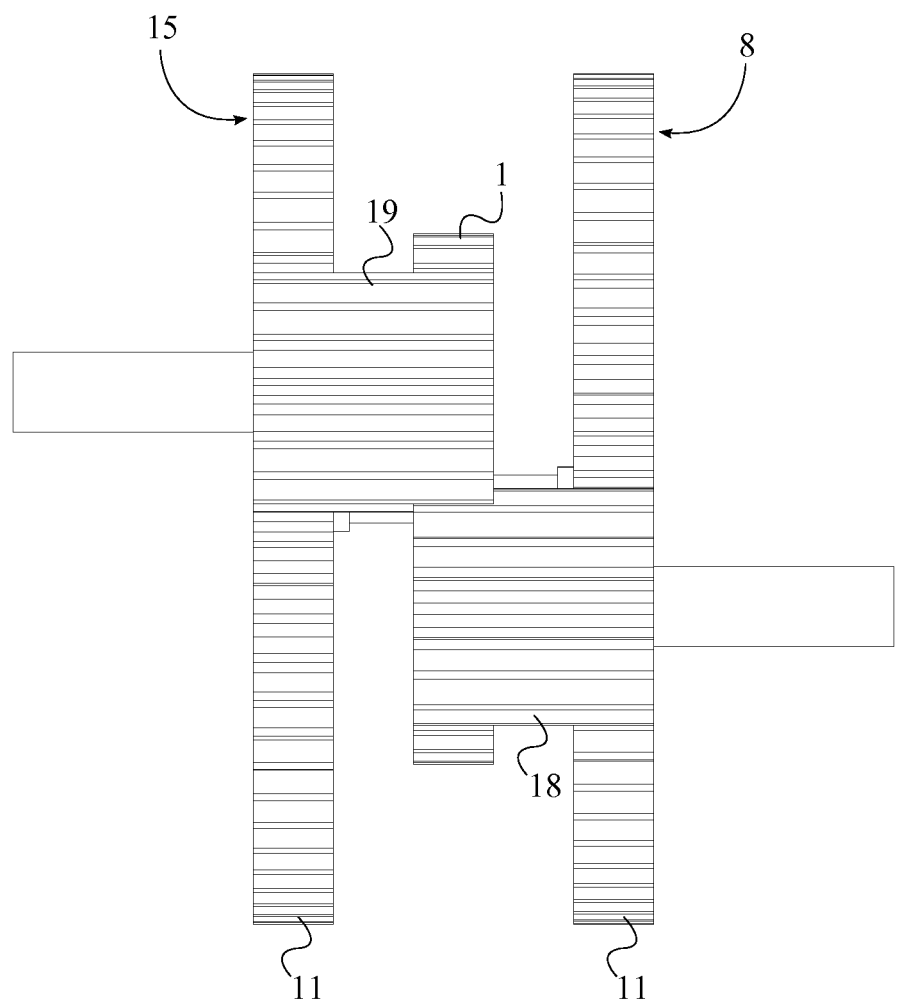
FIG. 12 is a top view of the first configuration of the present invention, wherein the steering input is shown in its second embodiment.

FIG. 5 and FIG. 10 illustrate the plurality of first mounts 3 and the plurality of second mounts 4 of the first configuration. The required number of mounts depends on the number of planet gears available in a single gear assembly. The plurality of first mounts 3 and the plurality of second mounts 4 are normal to the spur gear 2 which allows the plurality of planet gears 14 to be positioned in parallel with the planet carrier 1. The plurality of first mounts 3 is diametrically opposed about the spur gear 2 and is connected adjacent to the spur gear 2. Similarly, the plurality of second mounts 4 is diametrically opposed about the spur gear 2 and is connected adjacent to the spur gear 2.

The propelling input 5 of the present invention is an input gear. The input gear is engaged to the spur gear 2 of the planet carrier 1 such that the forward or backward motion of the input gear affects the rotational direction of the spur gear 2. More specifically, if the propelling input 5 rotates in a clockwise direction, the planet carrier 1 rotates in a counterclockwise direction. Similarly, if the propelling input 5 rotates in a counterclockwise direction, the planet carrier 1 rotates in a clockwise direction.

The first configuration of the present invention can include two embodiments for the steering input 6. The first embodiment of the steering input 6 is a helical bevel gear 7. However, a straight bevel gear can also be utilized in the first embodiment of the steering input 6 instead of the helical bevel gear 7. In order to properly engage to the helical bevel gear 7, the ring gear 9 of the first planetary gear assembly 8 and the second planetary gear assembly 15 comprises a set of external helical bevel gear teeth 10. The helical bevel gear 7 is perpendicularly engaged to the set of external helical bevel gear teeth 10 for both the first planetary gear assembly 8 and the second planetary gear assembly 15. As a result of the engagement, the ring gear 9 of the first planetary gear assembly 8 has a rotational direction opposite to the rotational direction of the ring gear 9 of the second planetary gear assembly 15. If the ring gear 9 of the first planetary gear assembly 8 rotates in a clockwise direction, the ring gear 9 of the second planetary gear assembly 15 rotates in a counterclockwise direction. Similarly, if the ring gear 9 of the first planetary gear assembly 8 rotates in a counterclockwise direction, the ring gear 9 of the second planetary gear assembly 15 rotates in a clockwise direction.

Figure 9:
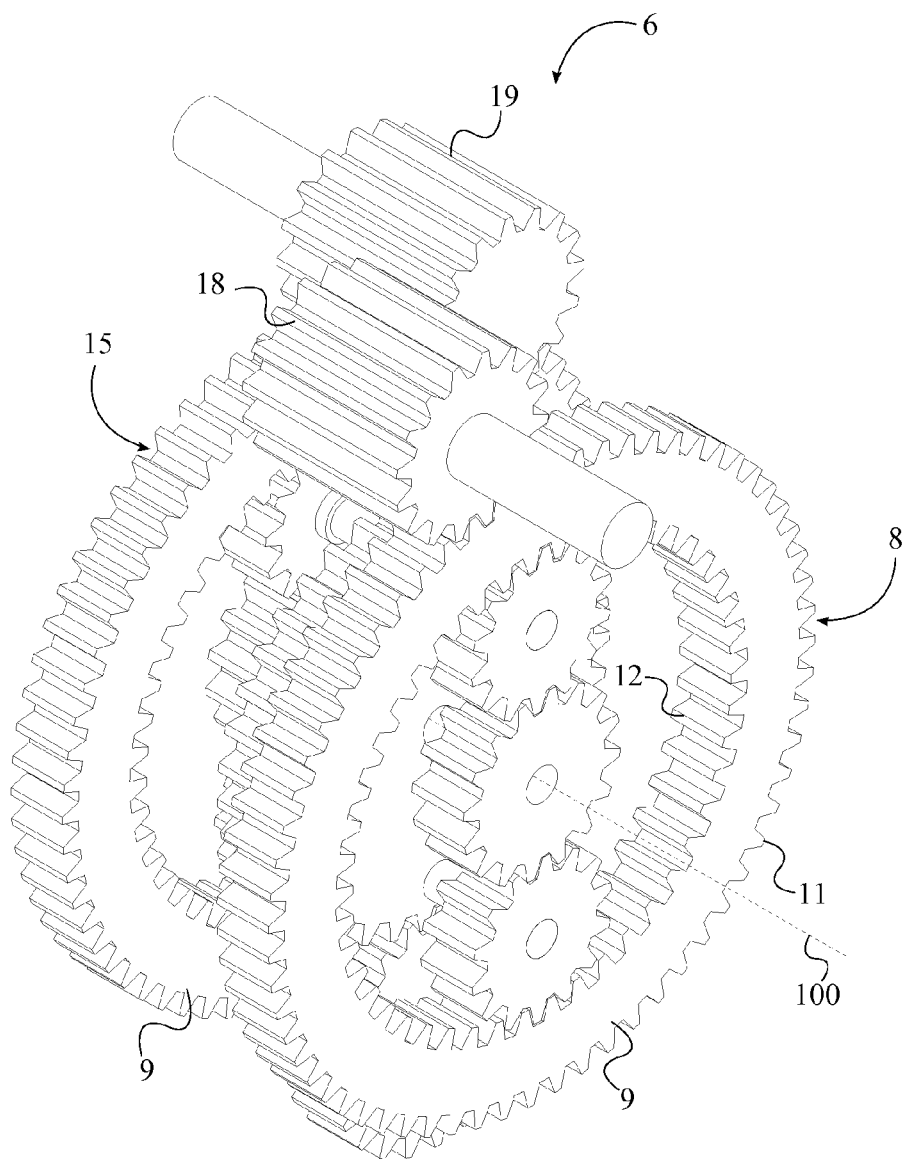
FIG. 9 is a perspective view of the first configuration of the present invention, wherein the steering input is shown in its second embodiment.

The second embodiment of the steering input 6 comprises a first input gear 18 and a second input gear 19. As seen in FIG. 9, the first input gear 18 is engaged to the second input gear 19. In order to implement the second embodiment of the steering input 6, the ring gear 9 of the first planetary gear assembly 8 and the second planetary gear assembly 15 needs to comprise a set of external spur gear teeth 11. The first input gear 18 is engaged to the external spur gear teeth 11 of the first planetary gear assembly 8. Similarly, the second input gear 19 is engaged to the external spur gear teeth 11 of the second planetary gear assembly 15.

The ring gear 9 of both the first planetary gear assembly 8 and the second planetary gear assembly 15 comprises a set of internal spur gear teeth 12. The internal spur gear teeth 12 are utilized to engage with the plurality of planet gears 14. The plurality of planet gears 14 is encircled by the ring gear 9 and is also engaged to the sun gear 13. Furthermore, the plurality of planet gears 14 is radially positioned around the sun gear 13. As a result of the positioning and the engagement, the plurality of planet gears 14 responds to the rotation of the ring gear 9 as well as the rotation of the sun gear 13.

Figure 14:
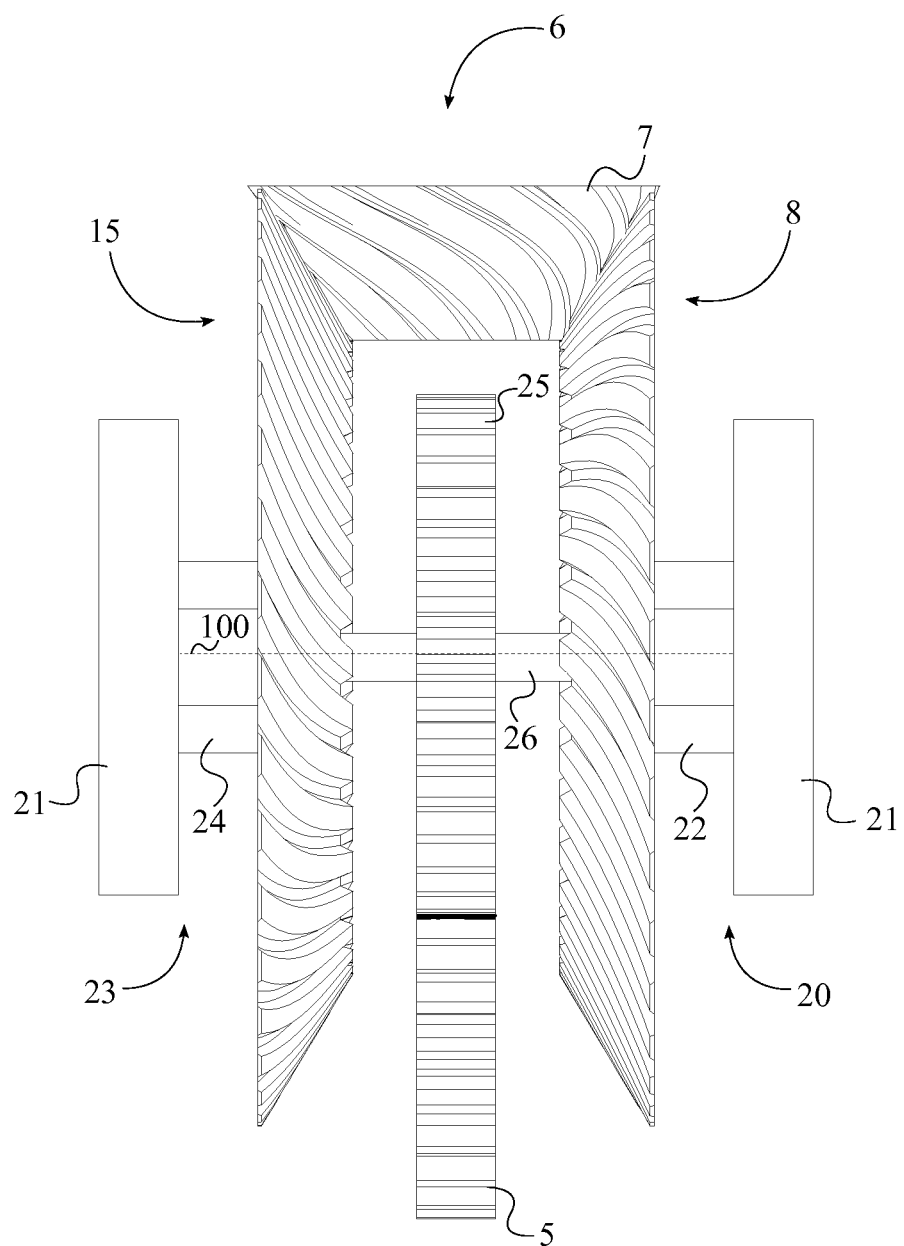
FIG. 14 is a front view of the second configuration of the present invention, wherein the steering input is shown in its first embodiment.
Figure 15:
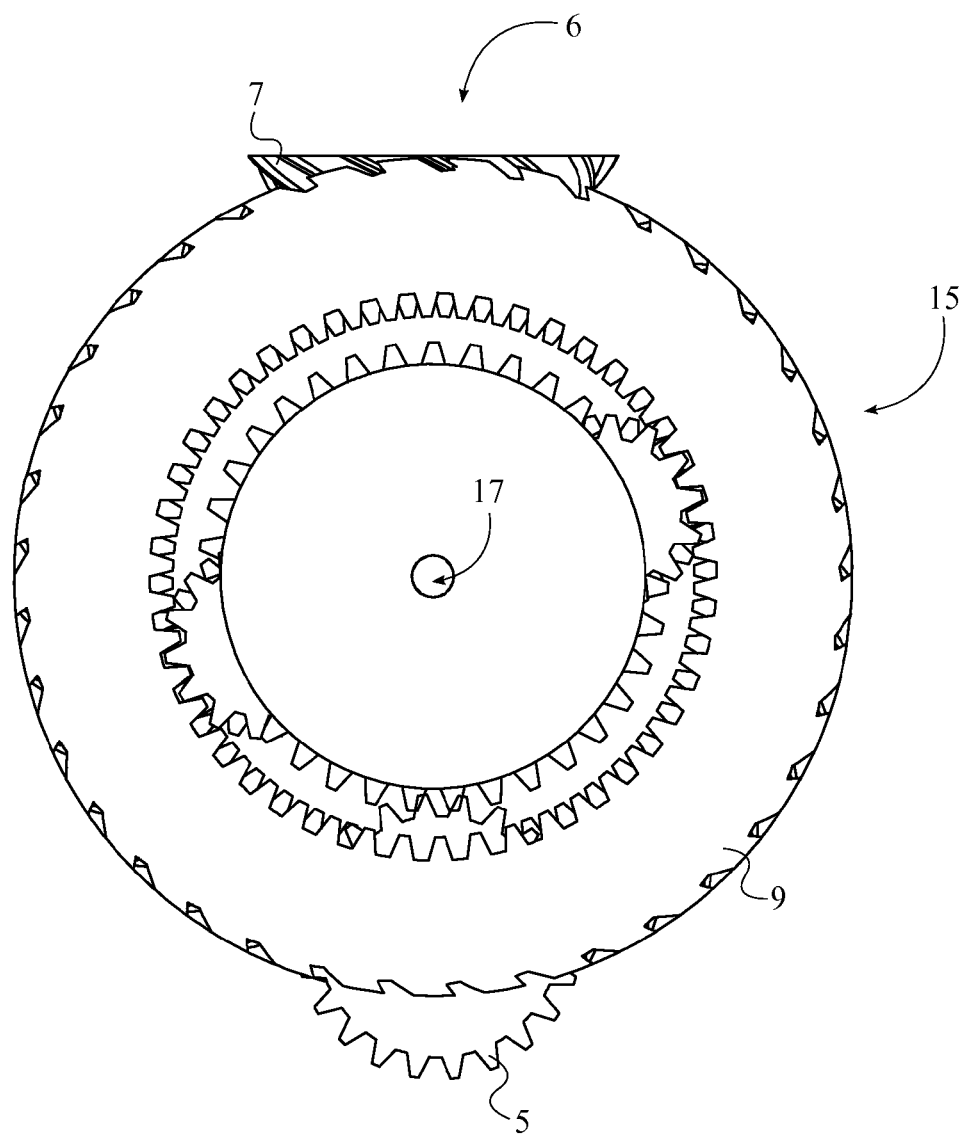
FIG. 15 is a right side view of the second configuration of the present invention, wherein the steering input is shown in its first embodiment.
Figure 16:
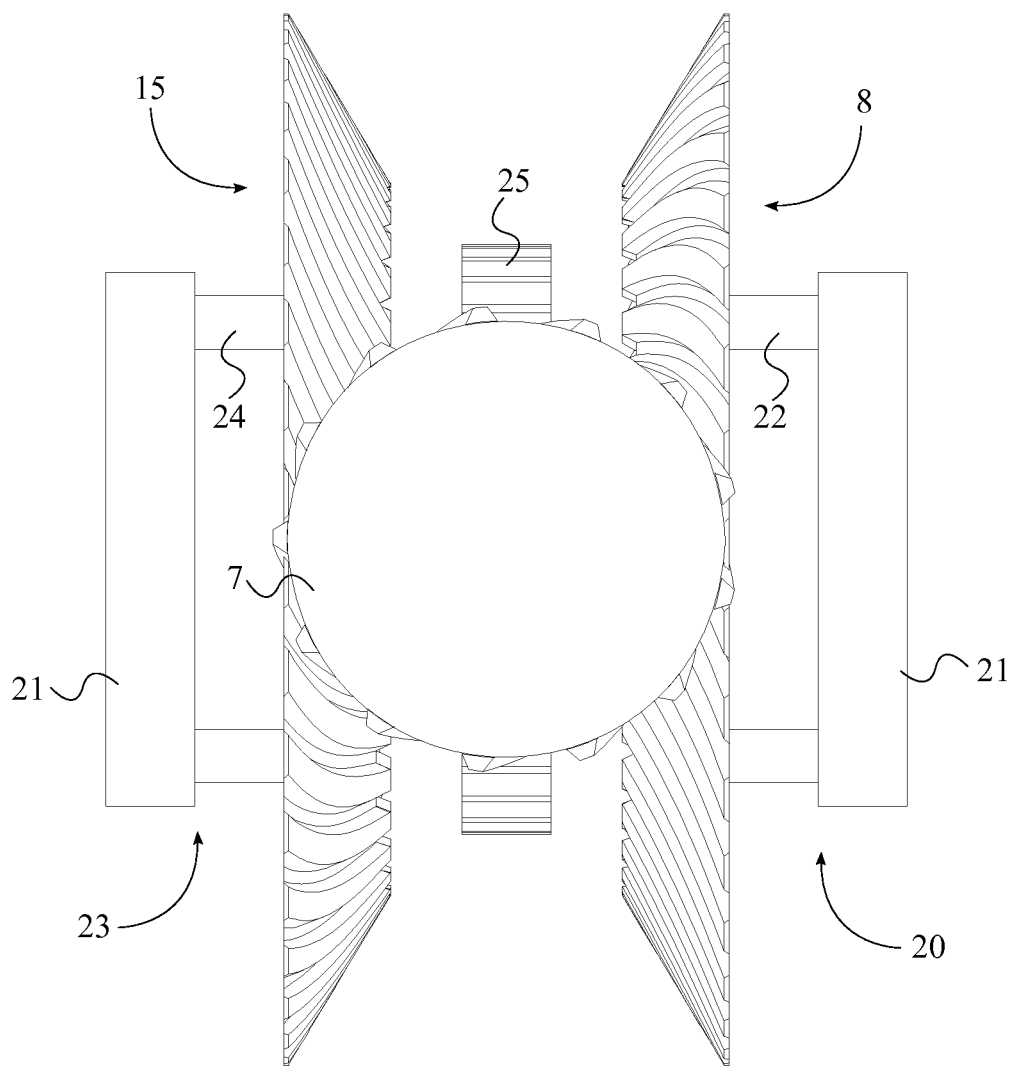
FIG. 16 is a top view of the second configuration of the present invention, wherein the steering input is shown in its first embodiment.
Figure 17:
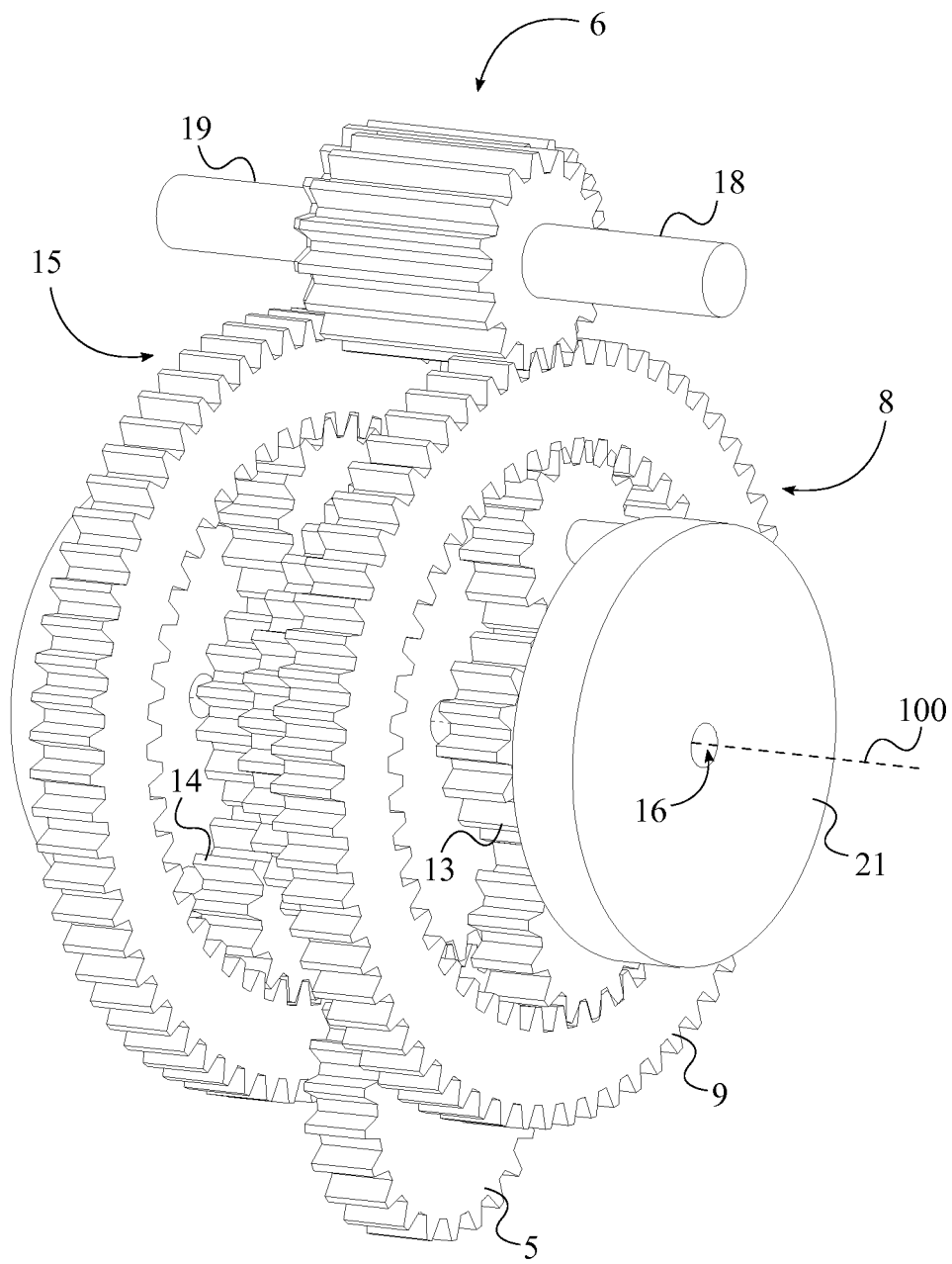
FIG. 17 is a perspective view of the second configuration of the present invention, wherein the steering input is shown in its second embodiment.
Figure 18:
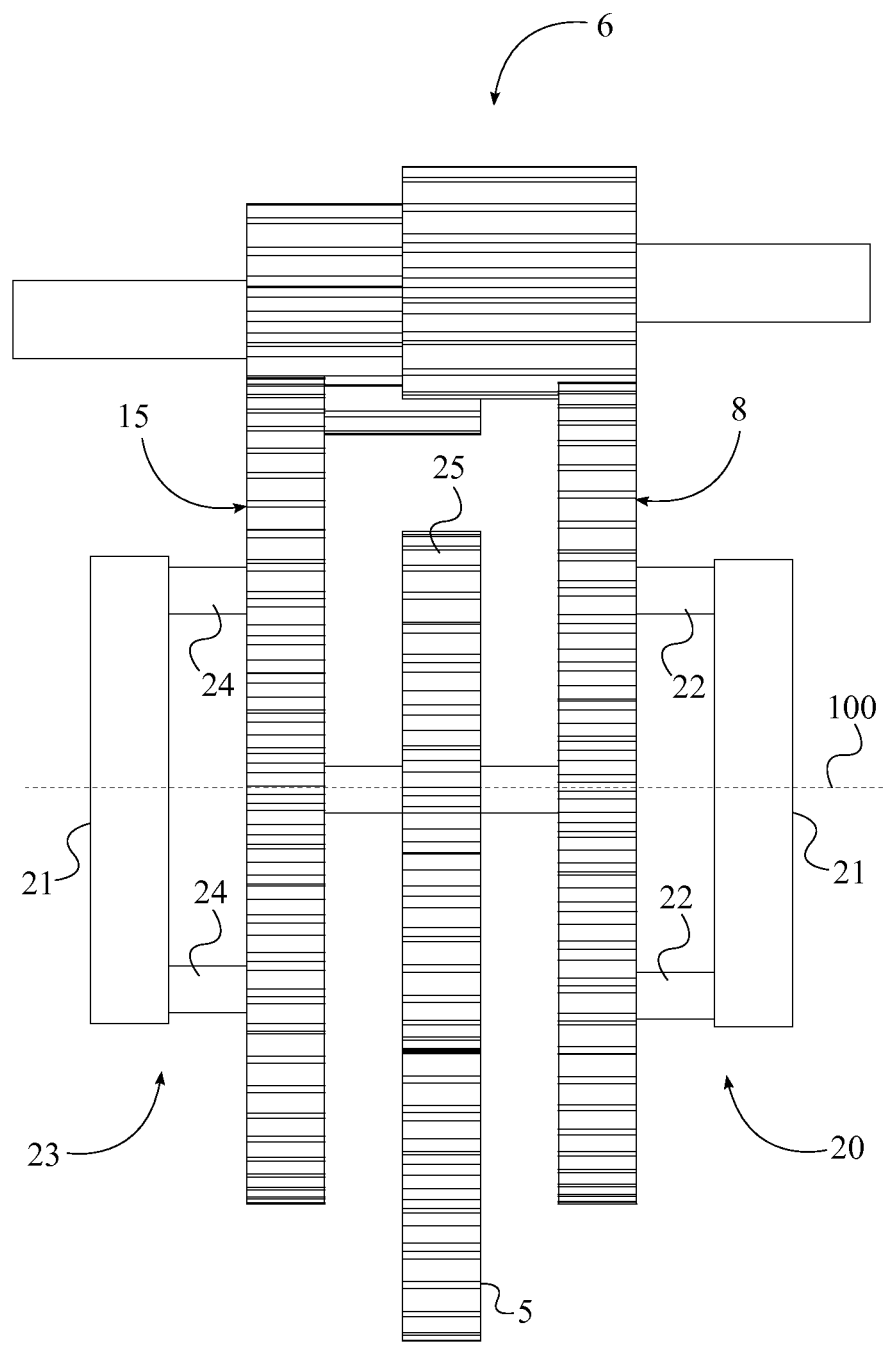
FIG. 18 is a front view of the second configuration of the present invention, wherein the steering input is shown in its second embodiment.
Figure 19:
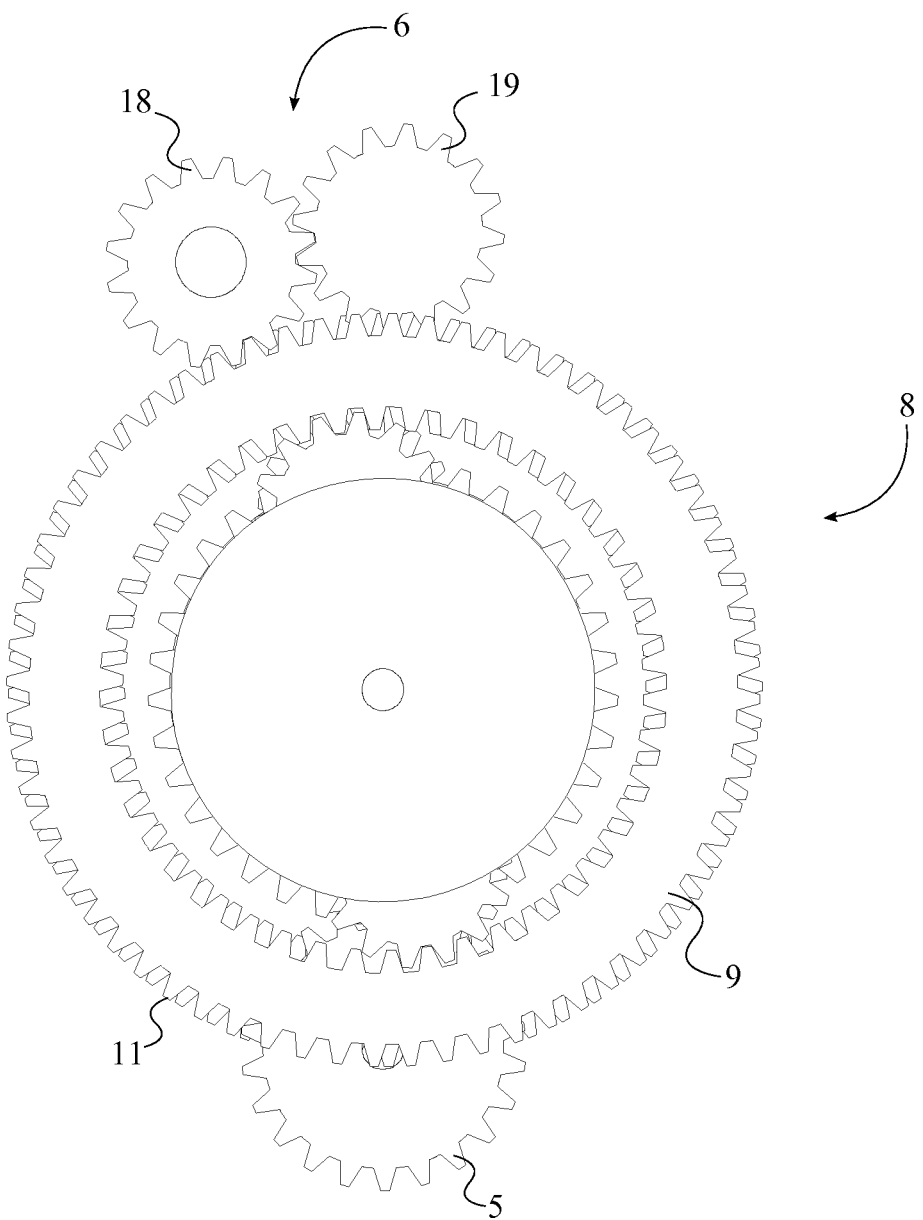
FIG. 19 is a left side view of the second configuration of the present invention, wherein the steering input is shown in its second embodiment.
Figure 20:
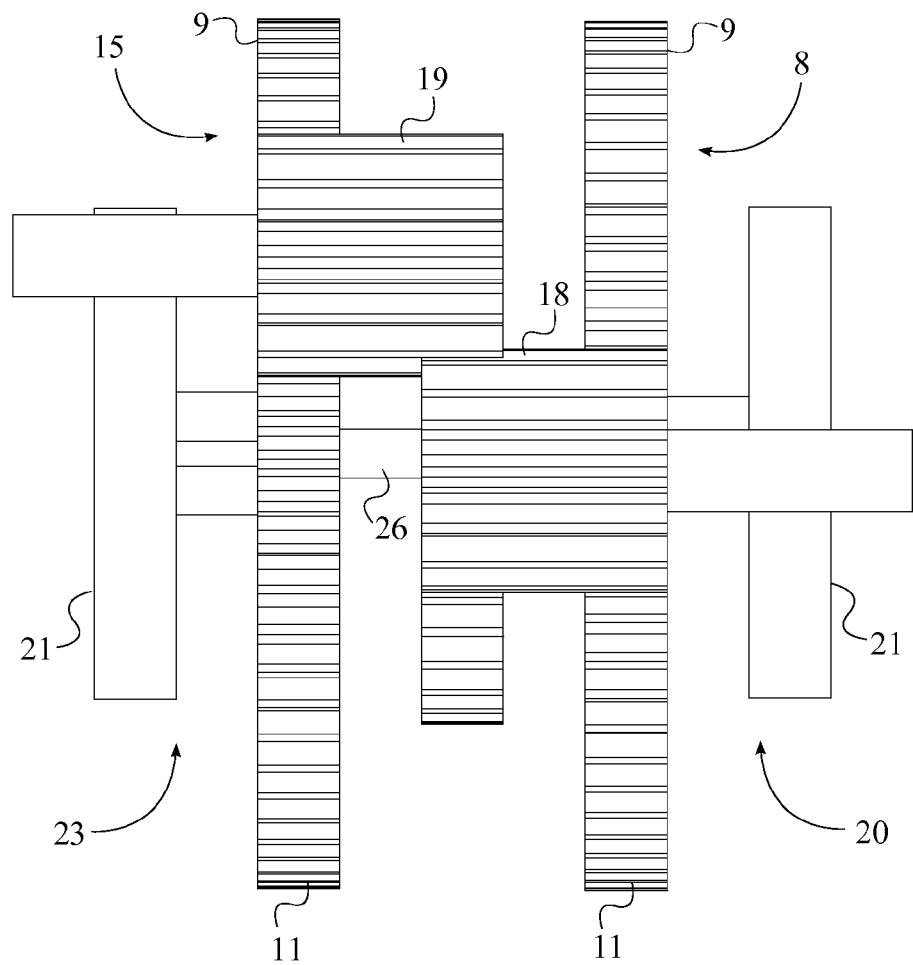
FIG. 20 is a top view of the second configuration of the present invention, wherein the steering input is shown in its second embodiment.

The second configuration of the present invention comprises a first planet carrier 20, a second planet carrier 23, a propelling input 5, a first output 16, a steering input 6, a second output 17, a first planetary gear assembly 8, a second planetary gear assembly 15, and a central gear 25. As seen in FIG. 14, the first planet carrier 20 and the second planet carrier 23 each comprise a carrier plate 21. Similar to the first configuration, the first planetary gear assembly 8 and the second planetary gear assembly 15 each comprise a ring gear 9, a sun gear 13, and a plurality of planet gears 14. The sun gear 13, the ring gear 9, the central gear 25, and the carrier plate 21 are concentrically mounted about a central rotation axis 100. Moreover, the central gear 25 is positioned in between the first planetary gear assembly 8 and the second planetary gear assembly 15. In contrast to being engaged to the planet carrier 1, the propelling input 5 is operatively engaged with the central gear 25 in the second configuration. As in the first configuration, the steering input 6 is externally and operatively engaged with the ring gear 9 of both the first planetary gear assembly 8 and the second planetary gear assembly 15.

In the second configuration, the first output 16 and the second output 17 are connected to the first planet carrier 20 and the second planet carrier 23 respectively. The first planet carrier 20 is positioned adjacent to the first planetary gear assembly 8 but opposite to the central gear 25. Similarly, the second planet carrier 23 is positioned adjacent to the second planetary gear assembly 15 but opposite to the central gear 25. The first output 16 is axially connected to the carrier plate 21 of the first planet carrier 20. Moreover, the second output 17 is axially connected to the carrier plate 21 of the second planet carrier 23. The first planet carrier 20 further comprises a plurality of first mounts 22. The plurality of first mounts 22 are rotatably connected to a corresponding planet gear from the first planetary gear assembly 8. As a result, the first planet carrier 20 rotates according to the orbiting motion of the corresponding planet gears. The plurality of first mounts 22 is positioned normal to the carrier plate 21. Therefore, the first planet carrier 20 is positioned in parallel to the first planetary gear assembly 8. The plurality of first mounts 22 extending from the carrier plate 21 depends on the plurality of planet gears 14 available in the first planetary gear assembly 8. Similar to the first configuration, the first planetary gear assembly 8 contains two planet gears. Therefore, the plurality of first mounts 22 is diametrically opposed about the carrier plate 21 and also connected adjacent to the carrier plate 21.

The second configuration of the present invention is symmetrical about the central gear 25 as seen in FIG. 14. Therefore, the second planet carrier 23 mirrors the positioning of the first planet carrier 20. The second planet carrier 23 further comprises a plurality of second mounts 24. Each of the plurality of second mounts 24 is rotatably connected to a corresponding planet gear from the second planetary gear assembly 15. The plurality of second mounts 24 is positioned normal to the carrier plate 21. Similar to the plurality of first mounts 22, the plurality of second mounts 24 is diametrically opposed about the carrier plate 21 and is connected adjacent to the carrier plate 21.

Similar to the first configuration, the second configuration also has a propelling input 5 and a steering input 6 as seen in FIGS. 13-20. The propelling input 5 is an input gear. The input gear is engaged to the central gear 25 such that the central gear 25 has a rotational direction opposite to the propelling input 5. If the propelling input 5 rotates in a clockwise direction, the central gear 25 will rotate in a counterclockwise direction. Similarly, if the propelling input 5 rotates in a counterclockwise direction, the central gear 25 rotates in a clockwise direction.

Figure 13:
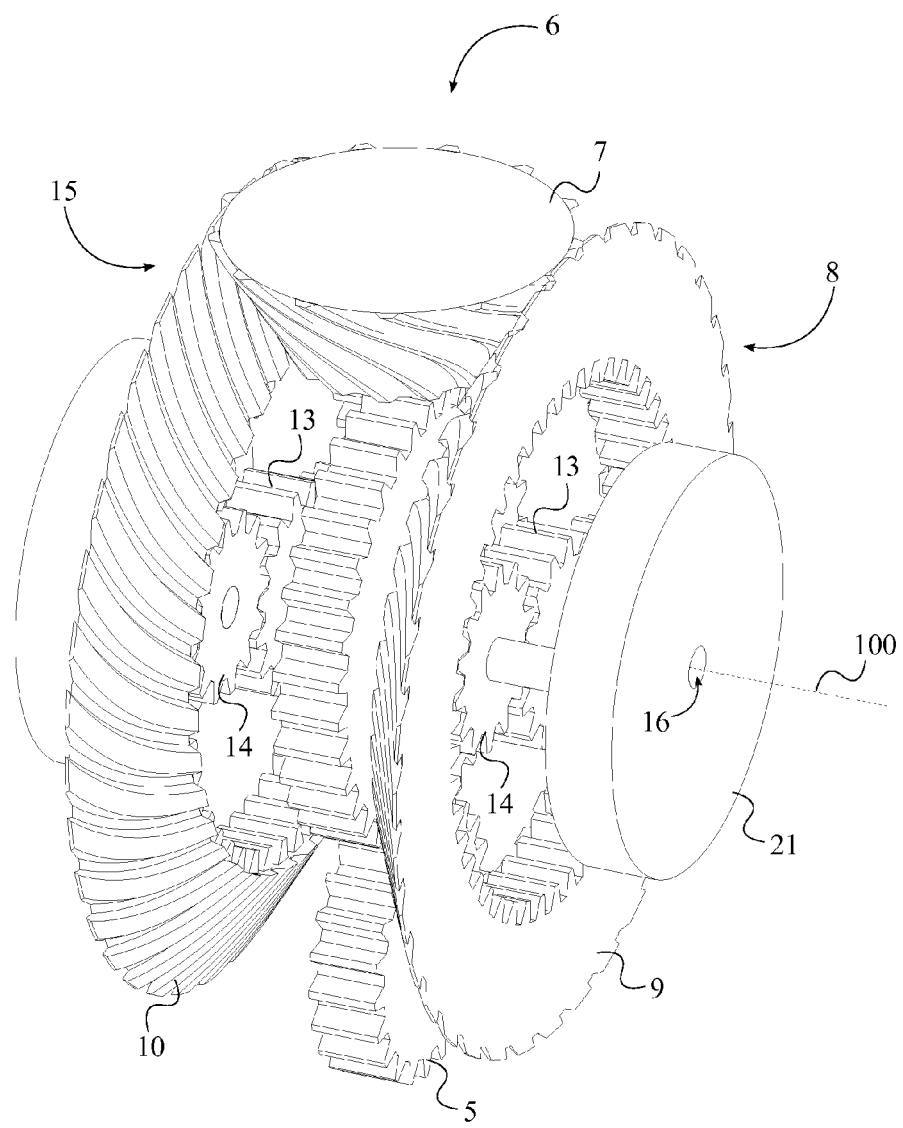
FIG. 13 is a perspective view of the second configuration of the present invention, wherein the steering input is shown in its first embodiment.

The second configuration also has two embodiments for the steering input 6. As seen in FIG. 13, the first embodiment of the steering input 6 is a helical bevel gear 7. Similar to the first embodiment of the steering input 6 in the first configuration, a straight bevel gear can also be utilized as the steering input 6 in the second configuration. In order to properly engage to the helical bevel gear 7, the ring gear 9 of the first planetary gear assembly 8 and the second planetary gear assembly 15 comprises a set of external helical bevel gear teeth 10. The helical bevel gear 7 is perpendicularly engaged to the set of external helical bevel gear teeth 10 for both the first planetary gear assembly 8 and the second planetary gear assembly 15. As a result, the ring gear 9 of the first planetary gear assembly 8 has a rotational direction opposite to the rotational direction of the ring gear 9 of the second planetary gear assembly 15, resulting in the leftward or rightward motion.

As in the first configuration, the second embodiment of the steering input 6 comprises a first input gear 18 and a second input gear 19. As seen in FIGS. 17-20, the first input gear 18 is engaged to the second input gear 19. In order to implement the second embodiment of the steering input 6, the ring gear 9 of the first planetary gear assembly 8 and the second planetary gear assembly 15 comprises a set of external spur gear teeth 11. The first input gear 18 is engaged to the external spur gear teeth 11 of the first planetary gear assembly 8. Similarly, the second input gear 19 is engaged to the external spur gear teeth 11 of the second planetary gear assembly 15.

In the first configuration of the present invention, the plurality of first mounts 3 is connected to the first planetary gear assembly 8 and the planet carrier 1. Similarly, the plurality of second mounts 4 is connected to the second planetary gear assembly 15 and the planet carrier 1. However, in the second configuration, the planet carrier 1 is replaced with a central gear 25. The second configuration of the present invention comprises a cross axle 26. The sun gear 13 of the first planetary gear assembly 8 is axially and adjacently connected to the cross axle 26. Similarly, the sun gear 13 of the second planetary gear assembly 15 is axially and adjacently connected to the cross axle 26, opposite to the sun gear 13 of the first planetary gear assembly 8. Furthermore, the central gear 25 is axially connected to the cross axle 26 in between the sun gear 13 of the first planetary gear assembly 8 and the sun gear 13 of the second planetary gear assembly 15.

Although the invention has been explained in relation to its preferred embodiment, it is to be understood that many other possible modifications and variations can be made without departing from the spirit and scope of the invention as hereinafter claimed.

What is claimed is:

1. A multiple planet gear set with a limited slip transmission system comprises:
   a planet carrier;
   a propelling input;
   a first output;
   a steering input;
   a second output;
   a first planetary gear assembly;
   a second planetary gear assembly;
   the first planetary gear assembly and the second planetary gear assembly each comprise a ring gear, a sun gear, and a plurality of planet gears;
   the sun gear and the ring gear of the first planetary gear assembly being concentrically mounted about a central rotation axis;

the sun gear and the ring gear of the second planetary gear assembly being concentrically mounted about the central rotation axis;

the propelling input being operatively engaged with the planet carrier;

the steering input being externally and operatively engaged with the ring gear of both the first planetary gear assembly and the second planetary gear assembly, in order to rotate the ring gear of the first planetary gear assembly and the ring gear of the second planetary gear assembly in opposite rotational directions;

the planet carrier being positioned in between the first planetary gear assembly and the second planetary gear assembly;

the first output being axially connected to the sun gear of the first planetary gear assembly;

the second output being axially connected to the sun gear of the second planetary gear assembly;

the planet carrier comprises a spur gear, a plurality of first mounts and a plurality of second mounts;

each of the plurality of first mounts being rotatably connected to a corresponding planet gear from the first planetary gear assembly; and each of the plurality of second mounts being rotatably connected to a corresponding planet gear from the second planetary gear assembly.

2. The multiple planetary gear set with the limited slip transmission system as claimed in claim 1 comprises:

the plurality of first mounts being positioned normal to the spur gear;

the plurality of first mounts being diametrically opposed about the spur gear; and the plurality of first mounts being connected adjacent to the spur gear.

3. The multiple planetary gear set with the limited slip transmission system as claimed in claim 1 comprises:

the plurality of second mounts being positioned normal to the spur gear;

the plurality of second mounts being diametrically opposed about the spur gear; and the plurality of second mounts being connected adjacent to the spur gear, opposite the plurality of first mounts.

4. The multiple planetary gear set with the limited slip transmission system as claimed in claim 1 comprises:

the propelling input being an input gear; and the input gear being engaged to the spur gear of the planet carrier.

5. The multiple planetary gear set with the limited slip transmission system as claimed in claim 1 comprises:

the steering input being a bevel gear;

the ring gear of both the first planetary gear assembly and the second planetary gear assembly each comprises a set of external bevel gear teeth;

the bevel gear being perpendicularly engaged to the set of external bevel gear teeth of the first planetary gear assembly; and the bevel gear being perpendicularly engaged to the set of external bevel gear teeth of the second planetary gear assembly.

6. The multiple planetary gear set with the limited slip transmission system as claimed in claim 1 comprises:

the steering input being a first input gear and a second input gear;

the ring gear of both the first planetary gear assembly and the second planetary gear assembly each comprises a set of external spur gear teeth;

the first input gear being engaged to the second input gear;

the first input gear being engaged to the set of external spur gear teeth of the first planetary gear assembly; and the second input gear being engaged to the set of external spur gear teeth of the second planetary gear assembly.

7. The multiple planetary gear set with the limited slip transmission system as claimed in claim 1 comprises:

each ring gear comprises a set of internal spur gear teeth;

each of the plurality of planet gears being engaged to the set of internal spur gear teeth of the respective ring gear;

each of the plurality of planet gears being encircled by the respective ring gear;

each of the plurality of planet gears being engaged to the respective sun gear; and each of the plurality of planet gears being radially positioned around the respective sun gear.

* * * * *